J. H. LANDWEHR.
DRINKING VESSEL.
APPLICATION FILED APR. 10, 1908.

954,978.

Patented Apr. 12, 1910.

WITNESSES:
F. L. Ourand
M. A. Freeman

INVENTOR
John Henry Landwehr
BY Louis Bagger & Co.
his Attorneys

UNITED STATES PATENT OFFICE.

JOHN HENRY LANDWEHR, OF SHEBOYGAN, WISCONSIN.

DRINKING VESSEL.

954,978.  Specification of Letters Patent.  Patented Apr. 12, 1910.

Application filed April 10, 1908. Serial No. 426,307.

*To all whom it may concern:*

Be it known that I, JOHN HENRY LANDWEHR, a citizen of the United States, residing at Sheboygan, in the county of Sheboygan and State of Wisconsin, have invented certain new and useful Improvements in Drinking Vessels, of which the following is a specification.

My invention relates to an improvement in drinking vessels for poultry, and the object is to provide a vessel which is simple in construction and which can be manufactured at a very small cost.

The invention consists in certain novel features of construction and combinations of parts which will be hereinafter described and pointed out in the claims.

Figure 1:
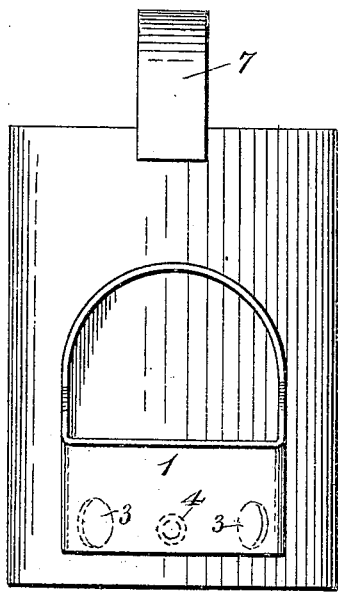
Figure 2:
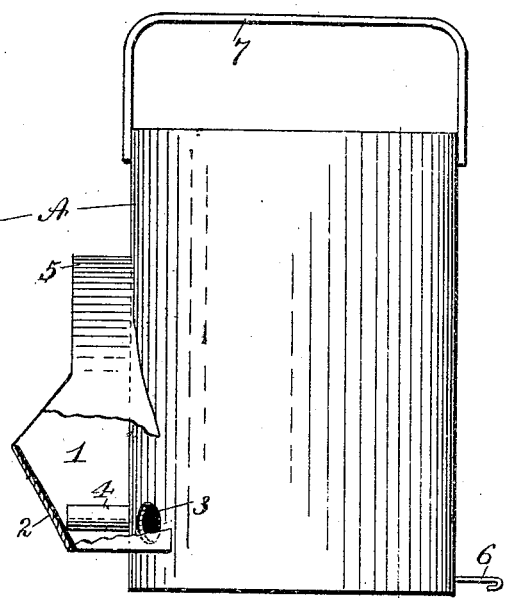
Figure 3:
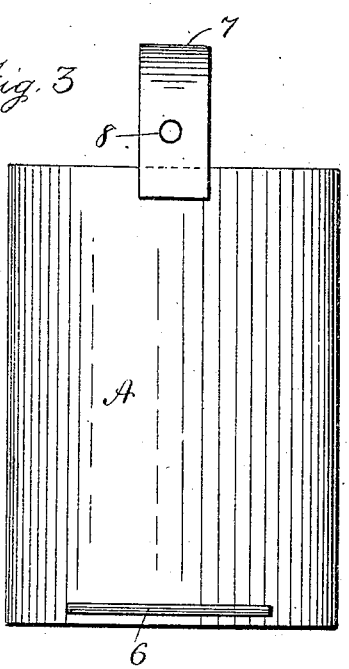
Figure 4:
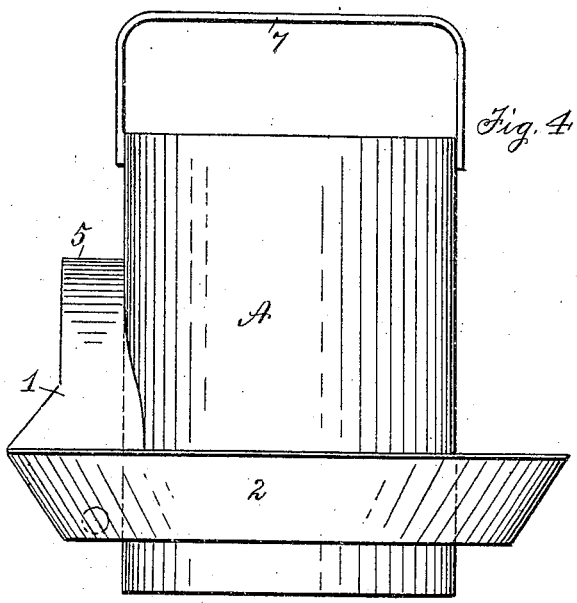

In the accompanying drawings Figure 1 is a view in front elevation; Fig. 2 is a view showing the trough broken away; Fig. 3 is a rear view, and Fig. 4 is a modification.

A, represents the vessel or fountain, which is preferably made cylindrical, and 1 is the trough which is provided with a flaring apron. Openings 3, 3 are formed in the cylinder leading to the trough 1, and between the openings is a tube 4, which is secured to the vessel and which forms a vent to permit the air from the receptacle to pass out when it is being filled. A covering 5 extends over the trough and is secured to the body of the vessel. A lip 6 is secured to the bottom of the vessel and preferably on the rear side, which is adapted to engage a clip or other means for holding the receptacle in position when it is suspended by the handle 7, the handle 7 being provided with an opening 8 whereby the vessel can be suspended if desired. The vessel can be provided with an annular trough if desired, as shown in Fig. 4.

When it is desired to fill the receptacle it is placed on its rear side and the water allowed to enter the openings 3, 3, and the tube 4 acting as a vent permits the air to pass from the receptacle, thereby preventing gurgling. When the receptacle is filled it can be placed upon the ground or suspended from any suitable support. By providing the trough 1 with the flaring apron 2 the receptacle can be easily emptied of the water when it is desired to refill the receptacle with fresh water. The flaring apron also enables the fowl to drink from the trough without wetting its wattles, which is of particular value in cold weather. When it is desired to empty the drinking vessel it may be done in one of two ways. It may be tilted until it rests upon the apron 2, or it may be placed upon its side so that one of the orifices 3 is lowermost and the upper one acting as a vent. In either way the contents will soon drain from the vessel.

It is evident that slight changes might be resorted to in the form and arrangement of the several parts described without departing from the spirit and scope of my invention, and hence I do not wish to be limited to the exact construction herein set forth, but:—

Having fully described my invention, what I claim as new and desire to secure by Letters Patent is:—

1. A drinking vessel, comprising a main receptacle, a combined trough and hood on one side thereof, the main receptacle having two openings therethrough into the opposite ends of the trough, and an air vent tube located within the trough.

2. A drinking vessel comprising a main receptacle, a combined trough and hood on one side thereof, the body portion of the vessel having openings within the trough and hood into the interior of the vessel through which the water issues, and a tube within the trough forming an air vent the outer end of which is constructed and adapted to extend above the level of the hood when in the position of being filled.

In testimony whereof I affix my signature in presence of two witnesses.

JOHN HENRY LANDWEHR.

Witnesses:
 F. H. DENISON,
 ANNA E. DENN.